Dec. 29, 1925.  1,567,768

W. H. SUMBLING

BEARING FOR CENTRIFUGAL EXTRACTORS

Filed Jan. 15, 1925

Inventor.
W. H. Sumbling,
By Egerton R. Case,
Atty.

Patented Dec. 29, 1925.

UNITED STATES PATENT OFFICE.

WILLIAM HENRY SUMBLING, OF TORONTO, ONTARIO, CANADA.

BEARING FOR CENTRIFUGAL EXTRACTORS.

Application filed January 15, 1925. Serial No. 2,685.

*To all whom it may concern:*

Be it known that I, WILLIAM HENRY SUMBLING, a subject of the King of Great Britain, residing in the city of Toronto, county of York, Province of Ontario, Canada, have invented certain new and useful Improvements in Bearings for Centrifugal Extractors, of which the following is a specification.

My invention relates to improvements in bearings for centrifugal extractors, and the principal object of my invention is to provide means readily accessible whereby pressure can be applied to the elastic cushions so as to bring forces into effect in order to maintain the spindle, under working conditions, in a more or less vertical position. Another object of my invention is to provide means for the purpose set forth which can be adapted to many hydro-extractors now in use, with very little trouble, and in the following specification, I shall illustrate and describe my invention, and what I claim as new will be set forth in the claims forming part of this specification.

Figure 1:
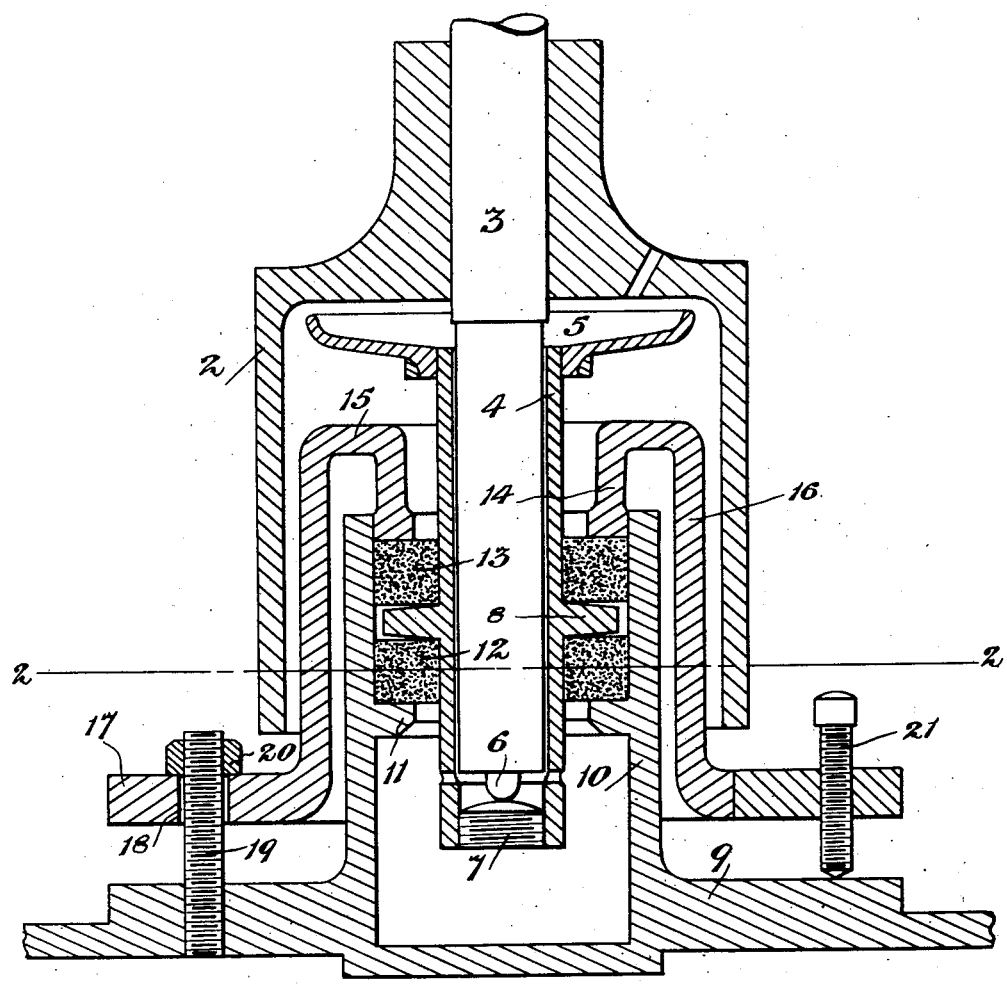
Figure 2:
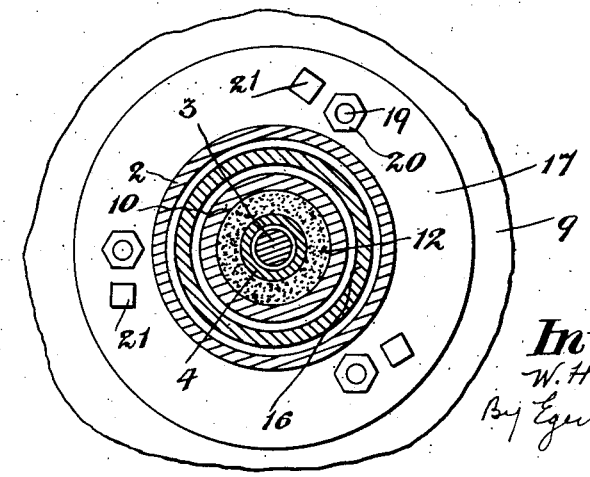

Fig. 1 is a vertical central longitudinal section through the bearing and the base therefor, as well as through a conventional form of pulley coupled to the basket spindle, part of which latter is shown in side elevation, and Fig. 2 is a horizontal cross section on the line 2—2, Fig. 1.

In the drawings, like characters of reference refer to the same parts.

The prior art plentifully shows bearings adapted to regulate pressure against the elastic cushions, but in all the modern machines this function cannot be carried out conveniently. The machine has to be stopped and certain parts removed before access can be had to the pressure regulating means for the elastic cushions. The result is, particularly where this type of machine is used in laundry work, much working time is lost in order to effect the proper adjustments, or else the machine is left operating under conditions which are most injurious to its effective working. It is the object of my invention to overcome the disadvantages mentioned in the machines in question, no matter for what purpose they may be used.

2 is an ordinary type of pulley rigidly coupled after any suitable manner to the basket spindle 3. This basket spindle is mounted at its lower end within a bearing bushing 4 which usually carries at its upper end an oil cup 5. Some suitable means must be provided to take up the end thrust of said spindle. A convenient means for this purpose I illustrate in the form of a stepped bearing 6 at the lower end of the spindle 3, which rests in contact with a step 7 secured in the lower end of the bearing bushing 4. Obviously various types of thrust bearings may be used.

8 is the ordinary flange the top and bottom sides of which converge outwardly, and this flange is carried by the bearing bushing 4. 9 is the base, and carried by this base is the tubular vertical portion 10 projecting thereabove, and which houses the major portion of the bearing bushing 4. 11 is a flange forming part of the tubular portion 10 and projecting inwardly, and carried by this flange is one of the elastic cushions 12. The flange 8 rests upon the cushion 12, and resting upon the upper side of said flange is an elastic cushion 13.

It will be observed that the flange 11 has clearance with the bearing bushing 4, and that the flange 8 has clearance with the inner wall of the tubular portion 10.

It is now a common practice to thread the upper inner portion of the tubular member 10 and to screw a nut thereinto through which the bearing bushing 4 passes. This nut is located within the pulley 2, and obviously this pulley and its spindle must be removed before access can be had to this nut. Now in contradistinction to this old practice, I do not internally thread the tubular portion 10, but leave it plain, and pass thereinto a tubular member 14 the lower portion of which may have sliding contact with the bore of said tubular portion 10, and is of sufficient thickness to permit effective pressure to be exerted upon the upper elastic cushion 13. This tubular member 14 has clearance with the bearing bushing 4, and its upper portion is provided with a horizontal flange 15 extending outwardly therefrom, and this flange 15 is integrally associated with a vertically-disposed member 16, preferably tubular in form, which extends below said horizontal flange 15 and carries at its lower end a horizontal flange 17 which extends outwardly therefrom. This member 16 is preferably spaced apart from the tubular portion 10, and of course is necessarily spaced apart from the pulley 2.

Formed in the flange 17 are a plurality of holes 18 through which pass threaded studs 19, the lower portions of which are tapped into the base 9. Nuts 20 are mounted on the upper threaded ends of said studs and rest against the flange 17. I prefer to use three of these studs located substantially 120° apart, and it will be understood that since access to the nuts 20 may be freely had, pressure may be applied at any side of the base 9 to the elastic cushions 12 and 13 to effect the purpose in view.

Set screws 21 are tapped through the flange 17 and rest against the base 9. There is a set screw located adjacent each stud 19, and they in adjusted position co-act with the said studs to lock the pressure controlling device which embraces the tubular member 14, flange 15, member 16, and flange 17.

Obviously the set screws 21 must be retracted before the nuts 20 can be used to apply pressure, through the medium of the studs 19, against said pressure device.

The bearing herein illustrated and described while simple in construction, is sturdy and efficient, and it must be understood that any changes in construction which will not depart from the principle of the invention herein-disclosed I consider as falling within the terms of my claims.

For instance, while in Fig. 1, I show the tubular member 14 as in contact with the inner bore of the tubular portion 10, there may be considerable clearance between these parts. In the sectional view shown in Fig. 1, the flange 17 has been cut through so as to illustrate the manner in which the set screws 21 are mounted therein.

What I claim as my invention is:

1. In a centrifugal extractor, in combination a basket spindle; a pulley attached thereto through which the lower end of said spindle passes; a bearing bushing for the lower end of said spindle; a conventional form of flange forming part of said bushing and radially disposed in respect thereto; an elastic cushion located above and below said flange and in contact therewith; a base; a tubular vertical portion housing both of said cushions, and carried by said base, and in which said bearing bushing is located, a horizontal flange forming part of said tubular vertical portion and extending inwardly thereof and against which the lowermost of said elastic cushions rests, said flange having clearance with said bearing bushing, a pressure-controlling device having a horizontal flange located below said pulley, and passing up thereinto and into the upper end of said tubular vertical portion and resting in contact with the upper of said elastic cushions, and means associated with said horizontal flange and said base located to be easily gotten at to permit said pressure device to be manipulated to regulate the pressure against said elastic cushions.

2. In a centrifugal extractor, in combination a basket spindle; a pulley attached thereto through which the lower end of said spindle passes; a bearing bushing for the lower end of said spindle; a conventional form of flange forming part of said bushing and radially disposed in respect thereto; an elastic cushion located above and below said flange and in contact therewith; a base; a tubular vertical portion housing both of said cushions, and carried by said base, and in which said bearing bushing is located, a horizontal flange forming part of said tubular vertical portion and extending inwardly thereof and against which the lowermost of said elastic cushions rests, said flange having clearance with said bearing bushing; a pressure-controlling device having a hole-provided horizontal flange located below said pulley; and embracing a vertically-disposed member which passes up into said pulley and has clearance therewith and houses the tubular vertical portion of said base; a tubular member adapted to enter the upper end of said tubular vertical portion and come in contact with the uppermost elastic cushion, and connected with said vertically-disposed member above the uppermost of said cushions; studs tapped into said base and each passing through one of said holes formed in said horizontal flange; a nut for the upper end of each of said studs, and a set screw threaded through said horizontal flange and located adjacent each of said studs.

WILLIAM HENRY SUMBLING.